United States Patent
Dawes

[11] Patent Number: 5,842,231
[45] Date of Patent: Dec. 1, 1998

[54] HEAD COVERING USED TO PREVENT SPITTING

[76] Inventor: Kerry G. Dawes, 9760 Cow Creek Dr., Palo Cedro, Calif. 96073

[21] Appl. No.: 589,051

[22] Filed: Jan. 19, 1996

[51] Int. Cl.[6] ........................................................ A42B 1/04
[52] U.S. Cl. ..................................... 2/202; 2/171; 128/873
[58] Field of Search ............................... 2/171, 173, 174, 2/181, 181.2, 202, 203, 205, 206, 4, 424, 9; 128/869, 873, 874, 876

[56]  References Cited

U.S. PATENT DOCUMENTS

| | | |
|---|---|---|
| 128,451 | 7/1872 | Ackerman . |
| 806,099 | 12/1905 | Boehm . |
| 1,186,703 | 6/1916 | Sullivan . |
| 1,504,100 | 8/1924 | Danubio . |
| 1,678,649 | 7/1928 | Renault . |
| 1,802,262 | 4/1931 | Mahler ............................................ 2/4 |
| 2,184,240 | 12/1939 | McInnis . |
| 2,191,589 | 2/1940 | Sacks . |
| 2,353,025 | 7/1944 | Gautreaux ................................... 2/174 |
| 2,355,283 | 8/1944 | Diss . |
| 2,367,459 | 1/1945 | Corley ........................................ 2/174 |
| 2,443,848 | 6/1948 | Boeringer . |
| 2,446,122 | 7/1948 | Bills . |
| 2,477,437 | 7/1949 | Borowick . |
| 2,869,132 | 1/1959 | Drummond . |
| 3,241,155 | 3/1966 | Phillips . |
| 3,582,989 | 6/1971 | Fassbender . |
| 3,789,839 | 2/1974 | Lund et al. . |
| 4,397,044 | 8/1983 | Trepanier . |
| 4,589,408 | 5/1986 | Singer . |
| 4,698,853 | 10/1987 | Walton . |
| 4,805,639 | 2/1989 | Dial et al. . |
| 4,887,316 | 12/1989 | Morandini . |
| 4,979,236 | 12/1990 | Merrill et al. . |
| 5,107,547 | 4/1992 | Scheu . |
| 5,146,622 | 9/1992 | Blutstein . |
| 5,226,189 | 7/1993 | Blutstein ..................................... 2/202 |
| 5,367,706 | 11/1994 | Davidson . |

FOREIGN PATENT DOCUMENTS

| | | |
|---|---|---|
| 953456 | 9/1947 | France . |
| 1165524 | 11/1956 | France . |

*Primary Examiner*—Diana Biefeld
*Attorney, Agent, or Firm*—Majestic, Parsons, Siebert & Hsue

[57]  ABSTRACT

A head covering for preventing spitting comprises a mesh portion, which provides good ventilation and a fabric patch portion. The fabric portion is positioned on the head covering so that it covers the wearer's mouth. The wearer has good visibility and ventilation, but is prevented from spitting.

14 Claims, 1 Drawing Sheet

HEAD COVERING USED TO PREVENT SPITTING

BACKGROUND OF THE INVENTION

The present invention relates to head coverings. Prior art head coverings include protective veils used for beekeepers, such as that described in Trepanier U.S. Pat. No. 4,397,044; mosquito nettings such as Davidson U.S. Pat. No. 5,367,706; and gas masks such as that described in Lund, et al. U.S. Pat. No. 3,789,839.

SUMMARY OF THE INVENTION

The applicant has discovered that a head covering can be used to prevent suspects in custody from spitting on others. This head covering is useful since it may be possible to transmit some diseases through saliva.

The head covering of the present invention is designed to be seen through. Additionally, the head covering is designed to have good ventilation to avoid the head covering from becoming a hazard to the wearer. The head covering of the present invention includes a mesh portion defining holes. A fabric patch is positioned in a spot over the wearer's mouth. This fabric patch is air permeable. This fabric patch is preferably made of cotton or another material with a high air permeability. This fabric patch prevents the wearer from spitting on anyone while the head covering is worn. The head covering covers the entire head, so as to make the securing of the head covering easier. Since the head covering encloses the entire head, the head covering of the present invention is easier to put on a suspect than a strip of fabric, such as a doctor's mask.

The head covering can include straps to secure it on the wearer. The straps can go underneath the wearer's arms and connect through loops at the back of the head covering. The straps can be tied in the back of the head covering to make it more difficult for the wearer to remove the head covering.

The use of a mesh for the head covering provides very good ventilation. Because the head covering would be placed involuntarily onto the suspect, it is important that the head covering not be dangerous or threatening to the wearer.

The Lund, et al. patent describes a gas mask. The gas mask includes a gas impermeable section made of a plastic foil, as well as the filter. This gas mask would be unsuitable for use as a head covering to prevent spitting, because it could reduce the supply of air to the wearer and could cause claustrophobia or panic.

DETAILED DESCRIPTION OF THE DRAWINGS

Figure 1:
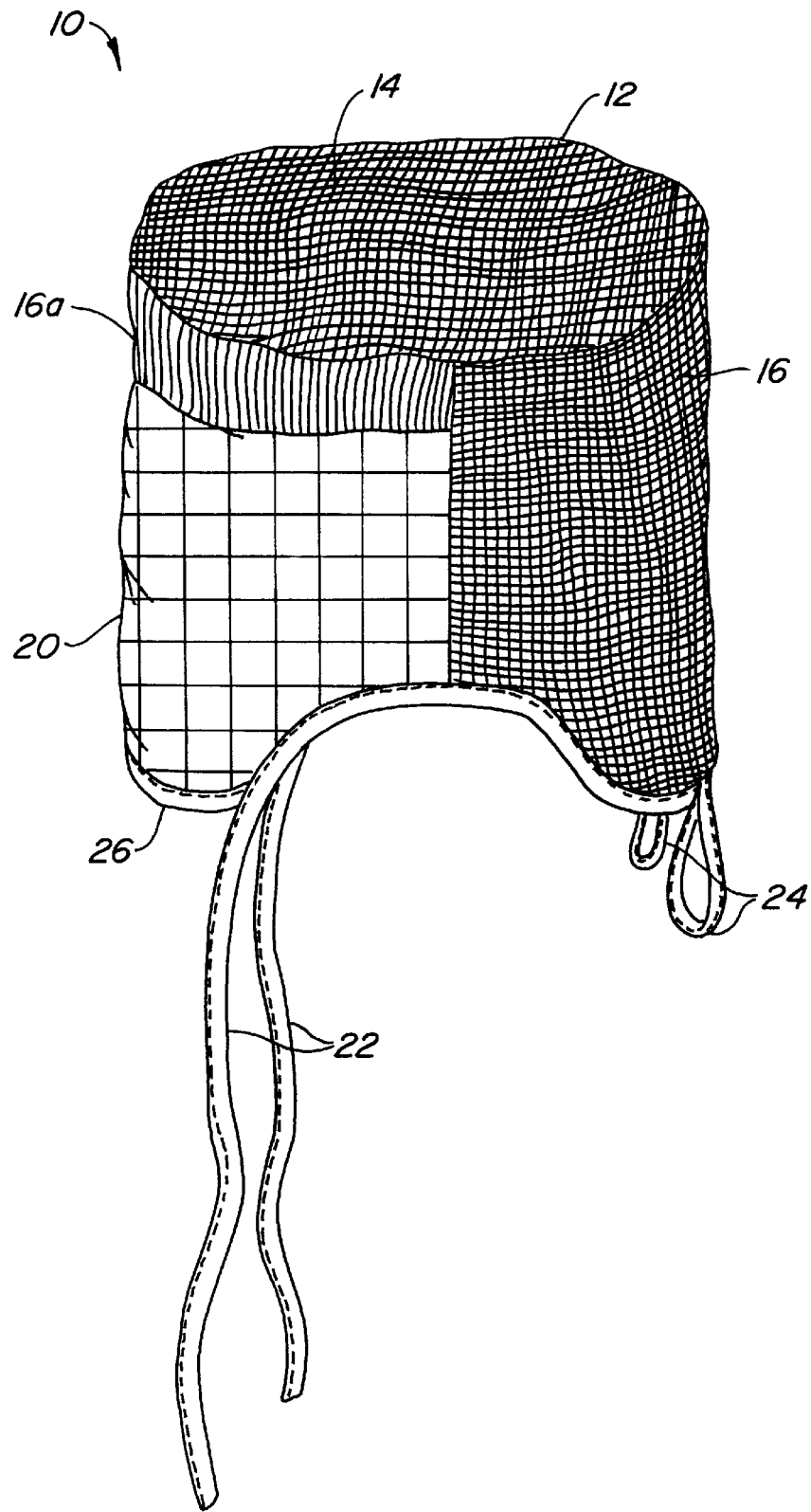
FIG. 1 is a perspective view of the head covering used to prevent spitting.

FIG. 1 shows a head covering 10 used to prevent spitting. This head covering includes a mesh portion 12. The mesh portion 12 is preferably made of a nylon material. In a preferred embodiment, the mesh portion 12 is made of a black Leno open-weave mesh. The mesh portion 12 has relatively large holes, which allows air to freely pass through, so that the head covering 10 does not induce panic or claustrophobia in the wearer. The head covering is preferably formed of a top portion 14 made of a circular piece of mesh sewn together with a cylindrical piece of mesh 16. The cylindrical piece of mesh 16 includes an area 16a, which allows the user to see through. The head covering includes a fabric patch portion 20. This fabric patch portion is attached to the mesh 12. In a preferred embodiment, this fabric patch 20 is attached in front or behind the mesh so that the patch is adequately supported.

The fabric patch 20 is air permeable and is preferably made of a cotton material. In a preferred embodiment, the fabric patch 20 comprises 8-ounce 100% Jersey cotton. Alternately, another material such as Sontara can be used rather than cotton. Sontara is comprised of spun laced wood pulp and polyester.

The use of the mesh 12 is important, because if a fabric material were to completely cover the head, although the fabric is air permeable, the amount of air reaching the user would be significantly decreased and the vision of the wearer would be impaired. Note that the head covering 10 can completely cover the head. This aids in putting the head covering onto the wearer. It would be more difficult put a fabric patch alone, such as a doctor's mask, onto the user's mouth.

The head covering 10 preferably includes tension straps 22 and loops 24 for securing the head covering to a person's head. These straps are preferably made of a strong nylon material. The base of the head covering 10 is also reinforced with the fabric material 26. The tension straps 22 can be placed underneath the wearer's arms, back through the loops 24 and securely tied behind the wearer's back. This prevents the wearer from easily removing the head covering, especially when the wearer is handcuffed.

In a preferred embodiment, the tension straps 22, tie down loops 24 and reinforcement 26 are made of 1-inch bias binding tape which is threaded with a #69 bonded nylon thread.

The present invention also provides a method for preventing spitting, including the steps of providing the head covering with a mesh portion and fabric portion, positioning the head covering over the person's head so that the fabric patch is in front of the wearer's mouth and securing the head covering on the person's head, preferably with the straps 22 and tie down loops 24.

Although several preferred embodiments of this invention have been described in detail therein with reference to the accompanying drawings, it is to be understood that the invention is not limited to these precise embodiments, and that various changes and modifications may be effected herein by one skilled in the art without departing from the scope or spirit of the invention as defined by the appended claims.

I claim:

1. A head covering comprising:
    a mesh portion with sufficient gaps to be seen through, the mesh portion allowing ventilation therethrough; and
    a fabric patch attached to the mesh portion, the fabric patch being comprised of an air permeable material and positioned on the head covering to cover a person's mouth when the head covering is put on a person's head, the fabric patch being such that a person with the covering placed on his head is prevented from spitting on people, wherein the head covering forms a continuous hood shaped to completely cover a person's head.

2. The head covering of claim 1, further comprising straps attached to a bottom of the head covering, the straps sized so as to fit under a person's arms to secure the head covering around a person's head.

3. The head covering of claim 2, wherein the straps are connected to a reinforcing material along the bottom of the head covering to prevent it from unraveling.

4. The head covering of claim 1, wherein the fabric patch is positioned so as to not cover a person's eyes when the head covering is worn on a person's head.

5. The head covering of claim 1, wherein the fabric patch is attached in front of the mesh portion inside the head covering.

6. The head covering of claim 1, wherein in the fabric patch is made of cotton.

7. The head covering of claim 1, wherein the mesh portion is made of a nylon mesh.

8. The head covering of claim 1, wherein the fabric patch includes a synthetic material.

9. The head covering of claim 8, wherein the fabric patch comprises spun-laced wood pulp and polyester.

10. The head covering of claim 1, wherein the continuous hood is sized such that it fits loosely on a normal adult's head.

11. A head covering comprising:
a mesh portion with sufficient gaps to be seen through, the mesh portion allowing ventilation therethrough;
a fabric patch attached to the mesh portion, the fabric patch being air permeable and positioned on the head covering to cover a person's mouth when the head covering is put on a person's head, the fabric patch being such that a person with the covering placed on his head is prevented from spitting on people, wherein the head covering is shaped to completely cover a person's head; and
straps attached to a bottom of the head covering, the straps comprising two loops on one side of the head covering and two drawstrings on the other side, the drawstrings being long enough to be secured through the loops under a person's arms.

12. The head covering of claim 11, wherein the loops are on the back of the head covering so that a knot can be formed at a person's back.

13. A head covering comprising:
a mesh portion with sufficient gaps to be seen through, the mesh portion allowing ventilation therethrough; and
a fabric patch attached to the mesh portion, the fabric patch being air permeable and positioned on the head covering to cover a person's mouth when the head covering is put on a person's head, the fabric patch being such that a person with the covering placed on his head is prevented from spitting on people, the fabric patch being unslited to prevent spitting through the patch, wherein the head covering forms a continuous hood shaped to completely cover a person's head.

14. A head covering comprising:
a mesh portion with sufficient gaps to be seen through, the mesh portion allowing ventilation therethrough; and
a fabric patch attached to the mesh portion, the fabric patch being air permeable and positioned on the head covering to covers a person's mouth when the head covering is put on a person's head, the fabric patch being sized so that the patch completely covers an average-sized human mouth so that a person with the covering placed on his head is prevented from spitting on people, wherein the head covering forms a continuous hood shaped to completely cover a person's head.

* * * * *